United States Patent [19]
Clements

[11] 3,828,809
[45] Aug. 13, 1974

[54] TRAIL LINE SHOE
[75] Inventor: Lloyd W. Clements, Woodland, Calif.
[73] Assignee: Ireco Industries, Inc., Eugene, Oreg.
[22] Filed: Dec. 13, 1972
[21] Appl. No.: 314,763

[52] U.S. Cl.................. 137/344, 239/272, 137/217
[51] Int. Cl............................................ F16k 45/00
[58] Field of Search............ 137/344, 217; 239/212, 239/213, 189, 196

[56] References Cited
UNITED STATES PATENTS
| | | | |
|---|---|---|---|
| 3,245,608 | 4/1966 | Purtell | 137/344 X |
| 3,286,723 | 11/1966 | Purtell | 239/212 X |
| 3,324,876 | 6/1967 | Morgan | 137/344 |
| 3,342,504 | 9/1967 | Seaton et al. | 239/213 X |
| 3,367,357 | 2/1968 | Miller | 137/344 |
| 3,512,548 | 5/1970 | Miller | 137/344 |
| 3,730,211 | 5/1973 | de Laine et al. | 137/344 |

*Primary Examiner*—Henry T. Klinksiek
*Attorney, Agent, or Firm*—Klarquist, Sparkman, Campbell, Leigh, Hall & Whinston

[57] ABSTRACT

An irrigation move has a trail line pulling a trail line shoe provided with a skid plate tapering at its forward end to a cylindrical, coupler body and having a sloping rear end to permit reverse movement of the trail line. The skid plate has a longitudinal groove which causes the skid plate to slide over mud.

7 Claims, 6 Drawing Figures

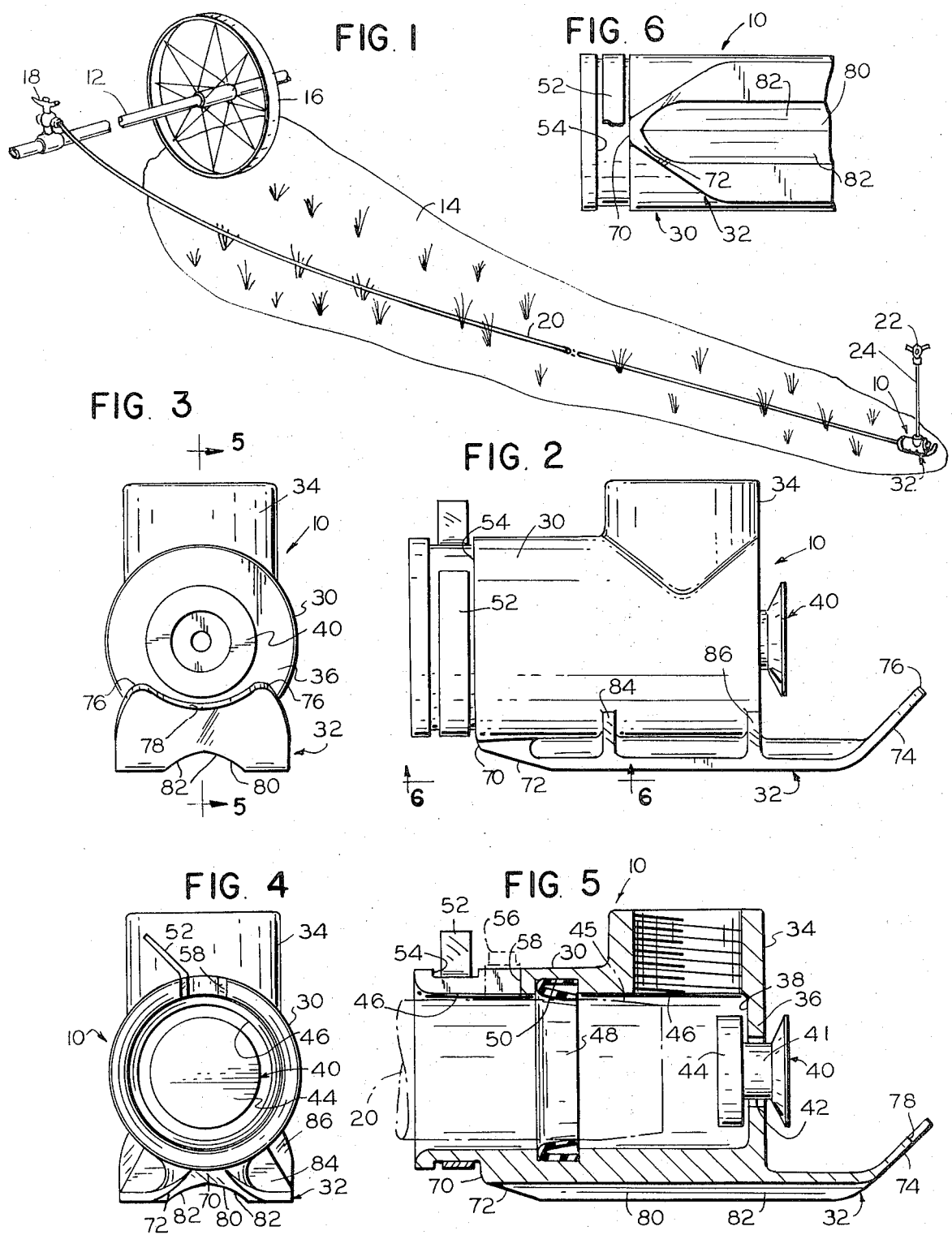

TRAIL LINE SHOE

This invention relates to an improved trail line shoe, and more particularly to a high flotation trail line shoe.

An object of the invention is to provide a new and improved trail line shoe.

Another object of the invention is to provide a high flotation trail line shoe.

A further object of the invention is to provide a trail line shoe having a skid plate with a wide longitudinal groove in the bottom thereof to improve skidding.

Another object of the invention is to provide a trail line shoe having a skid plate tapering having a forward end portion sloping upwardly to a cylindrical body and also tapering inwardly to the body.

In the drawings:

FIG. 1 is a fragmentary, perspective view of an irrigation line move including a trail line shoe forming one embodiment of the invention;

FIG. 2 is an enlarged side elevation view of the trail line shoe of FIG. 1;

FIG. 3 is an enlarged rear elevation view of the trail line shoe of FIG. 1;

FIG. 4 is an enlarged front elevation view of the trail line shoe of FIG. 1;

FIG. 5 is an enlarged, vertical, sectional view taken along line 5—5 of FIG. 3; and FIG. 6 is an enlarged view taken along line 6—6 of FIG. 2.

Referring now in detail to the drawings, there is shown therein an irrigation line move including trail line shoes 10 (only one of which is shown) forming one embodiment of the invention and also including a pipe 12 moved along a field 14 to the left as viewed in FIG. 1, while supported by wheels 16. Water from the pipe 12 is supplied to sprinklers 18 and to trail lines 20, which are connected to the trail line shoes and supply sprinklers 22 carried by risers 24 carried by the trail line shoes.

The trail line shoe 10 includes a cylindrical housing or body 30 supported in a horizontal position by a skid plate 32 and having a vertical, tapped outlet 34 into which the riser 24 is screwed. The body has a rear end wall 36 having a concave inner face 38 which is cylindrical about a vertical axis, and a known drain valve 40 has a shank 41 extending through a hole 42 in the end wall 36 and an enlarged head 44 sealing the hole only when the pressure of the water is greater than non-operating pressure. The trail line 20 has a tapered end connector 45 that fits in cylindrical chamber 46 and is sealed by an annular chevron seal 48 seated in annular groove 50 and is held by a latching band 52 in annular groove 54, the latching band engaging splining lug 56 on the end connector. A splining groove 58 receives the lug.

The skid plate 32 tapers, proceeding forwardly, to a blunted point 70 and also has a sloping sled-like or tapered, forward end portion 72 to enable the skid plate to slide over irregularities on the ground and to thread the skid plate through plants, weeds, etc. At the rear end, the skid plate has a sloping, sled-like portions 74 having rounded corners 76 and an arcuate clearance notch 78 to permit access to the hole 42 to be bored out.

The skid plate 32 has an arcuate, semi-V-shaped groove 80 having two cylindrical sides 82 and being about half of the width of the main portion of the skid plate. The groove, for some inexplicable reason, imparts high flotation to the skid plate, breaks suction in mud and causes the plate to slide easily over mud and soft ground as well as hard ground. The skid plate at its mid portion is integral with the body and reinforcing pairs of gussets 84 and 86 also secure the plate to the body. The shoe may be made by casting.

What is claimed is:

1. In an irrigation trail line shoe,
a body having first and second connector portions for attachment to a trail line and to a sprinkler riser,
and an elongated skid plate supporting the body, extending along substantially the entire length of the body and having a downwardly facing longitudinal groove extending the entire length of the skid plate to define runners,
the forward end portion of the skid plate tapering from a blunt point of a predetermined width at the forward end to a width several times the width of the blunt point and being sled-like, the runners being at the extreme outer edges of the skid plate.

2. In an irrigation trail line shoe,
a body having a first connector portion for attachment to a trail line and a second connector portion for attachment to a sprinkler riser,
and an elongated skid plate having a pointed, sled-like forward portion joined to the body and extending substantially the entire length of the body, the skid plate having a downwardly facing groove extending the entire length thereof and flat runners extending from the outer edges of the plate to the groove.

3. The irrigation trail line shoe of claim 2 wherein the groove is about half as wide as the skid plate.

4. The irrigation trail line shoe of claim 2 wherein the groove is generally V-shaped in transverse cross section.

5. The irrigation trail line shoe of claim 2 wherein the skid shoe extends substantially to the rear of the body.

6. The irrigation trail line shoe of claim 2 wherein the rear end portion of the skid shoe is sledlike.

7. The irrigation trail line shoe of claim 6 wherein the rear end portion of the skid plate has an upwardly facing clearance notch.

\* \* \* \* \*